Jan. 20, 1959  H. GLEITSMAN  2,869,902
TUBULAR FURNITURE
Filed Aug. 17, 1955
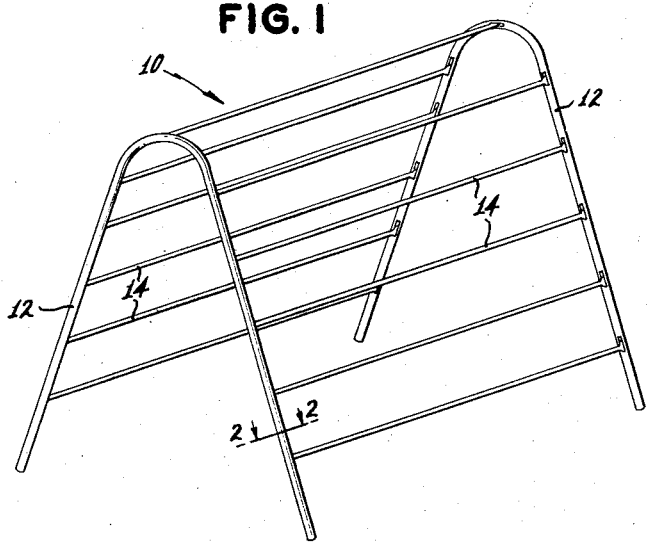
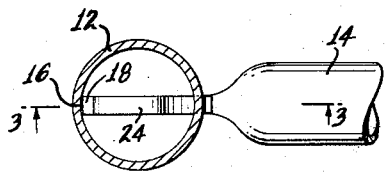
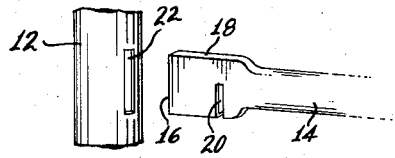
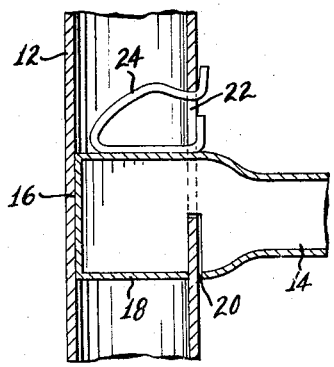
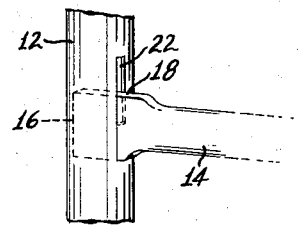
INVENTOR.
Harold Gleitsman
BY
ATTORNEYS

United States Patent Office 2,869,902
Patented Jan. 20, 1959

2,869,902

TUBULAR FURNITURE

Harold Gleitsman, New Rochelle, N. Y.

Application August 17, 1955, Serial No. 528,967

2 Claims. (Cl. 287—54)

This invention relates to tubular furniture and in particular to means and a method for connecting two intersecting tubes in tubular furniture.

An object of this invention is to provide new and improved means for connecting intersecting tubular members.

Another object of the present invention is to provide new and improved means for connecting intersecting tubular members in tubular furniture whereby to prevent any appreciable relative movement between said connected tubes.

A further object of this invention is to provide a new and improved method for connecting intersecting tubular members.

Another object of this invention is to provide generally improved tubular furniture which will be relatively rigid.

The above and other objects, features and advantages of the present invention will be more fully understood from the following description considered in connection with the accompanying illustrative drawings.

In the drawings:

Fig. 1 is a perspective view of a clothes rack made of tubular members;

Fig. 2 is a sectional view taken along the line 2—2 of Fig. 1;

Fig. 3 is a sectional view taken along the line 3—3 of Fig. 2;

Fig. 4 is a perspective view of a spring clip employed in maintaining the tubular members in connected condition in accordance with the present invention;

Fig. 5 is a perspective view of a pair of tubular members in position to be connected; and Fig. 6 is a perspective view similar to Fig. 5 showing the tubular members connected in accordance with the present invention.

Referring now to the drawing in detail, a clothes rack or dryer is shown in Fig. 1 to illustrate a piece of tubular furniture constructed in accordance with the present invention. Of course, the clothes rack is shown only for illustration and it will be understood that the present invention may be employed in any type of tubular furniture such as chairs, tables, towel racks or any other furniture made partly or wholly of tubular members. In the clothes rack 10 there are a pair of substantially V-shaped tubular members 12 which are connected together by horizontally extending tubular members 14. The present invention is directed particularly to the means and method for connecting members 14 to members 12.

In accordance with the present invention, the horizontally extending members 14 are flattened adjacent their ends 16 so as to form a flattened end portion 18. Flattened end portion 18 is provided with a slot 20 which is located from end 16 a distance slightly larger than the inner diameter of tubular member 12. Furthermore, tubular member 12 is provided at each point of connection with members 14 with a slit 22 which is of sufficient size to permit insertion of flattened end portion 18 of member 14 into tubular member 12. With the tubular members so prepared for connection (Fig. 5), they may be moved together so that flattened end portion 18 is inserted into slit 22 in member 12. This relative movement is continued until slot 20 in flattened end portion 18 registers with the wall of tubular member 12. It will be noted, since slot 20 is located from the end 16 of member 14 a slight distance in excess of the inner diameter of tubular member 12, that in order to register slot 20 with the wall of member 12 a slight forcing of member 12 must be effected in order to properly position the two members. After the slot 20 is registered with the wall of member 12 the member 14 and member 12 are moved relative to each other longitudinally of slot 20 so as to interengage slot 20 with the wall of member 12 (Fig. 6). Of course, since slot 20 is positioned from end 16 a distance slightly in excess of the inner diameter of tubular member 12, the movement of the members 12 and 14 longitudinally of slot 20 is a forced movement which causes a pressed fit of the two members (Fig. 3). With this tight or pressed fit effected as heretofore described, it is believed clear that there is little or no chance for relative movement between the two members 12 and 14.

In order to positively lock the members 14 and 16 in the position best shown in Fig. 6, a U-shaped spring clip 24 is inserted into the slit 22 in member 12 and forced to the position best shown in Fig. 3. In this position, spring clip 24 engages both the member 12 and the member 14 and biases said two members to the connected position heretofore described.

It will be seen that with a connection such as described above members 12 and 14 are securely held by the pressed fit resulting from the position of slot 20 relative to the end 16 of member 14 and by the bias of U-shaped spring clip 24 as already described. Accordingly, a secure interconnection of the two tubular members is effected thereby resulting in a firm rigid piece of tubular furniture such as clothes rack 10.

Although I have herein shown and described one form of the present invention, it will be understood that various changes and modifications may be made therein within the scope of the appended claims without departing from the spirit and scope of this invention.

Having thus described my invention, what I claim and desire to secure by Letters Patent is:

1. In an article of furniture, a pair of members mutually secured in interlocked relation, one of said members being tubular and being provided in its wall with a closed slit extending longitudinally thereof, the other member having a flattened end complementary to said slit and of a size to permit insertion thereof into said wall slit, said flattened end having a free marginal edge extending longitudinally of said tubular member and an open slot parallel to and spaced inwardly of said marginal edge a distance in excess of the original inner diameter of said tubular member to define a flattened end portion which exceeds said original inner diameter along the extent of said other member, and said flattened end extending through said slit, and said end portion being press fitted into said tubular member with said marginal edge and slot thereof engaged with diametrically opposing inner surface portions of said tubular member, with one of said inner surface portions extending from said slit longitudinally of said tubular member, whereby said end portion creates a resultant stress in the direction of the diameter of said tubular member and normal to the marginal edge and slot of said end portion to securely interlock said members.

2. In an article of furniture, a pair of members mutually secured in interlocked relation, one of said members being tubular and being provided in its wall with a closed slit extending longitudinally thereof, the other member having a flattened end complementary to said slit and of a size to permit insertion thereof into said wall slit, said flattened end having a free marginal edge extending longitudinally of said tubular member and an open slot parallel to and spaced inwardly of said marginal edge a distance in excess of the original inner diameter of said tubular member to define a flattened end portion which exceeds said original inner diameter along the extent of said other member, and said flattened end extending through said slit, and said end portion being press fitted into said tubular member with said marginal edge and slot thereof engaged with diametrically opposing inner surface portions of said tubular member, with one of said inner surface portions extending from said slit longitudinally of said tubular member, whereby said end portion creates a resultant stress in the direction of the diameter of said tubular member and normal to the marginal edge and slot of said end portion to securely interlock said members, and resilient means mounted in said slit and bearing on said end portion to retain said members in said interlocked relation.

References Cited in the file of this patent
UNITED STATES PATENTS

| | | |
|---|---|---|
| 1,439,930 | Walker | Dec. 26, 1922 |
| 1,473,817 | Gorsline | Nov. 13, 1923 |
| 2,620,237 | Kirkpatrick | Dec. 2, 1952 |
| 2,710,053 | Hamilton | June 7, 1955 |